Figure 1A:
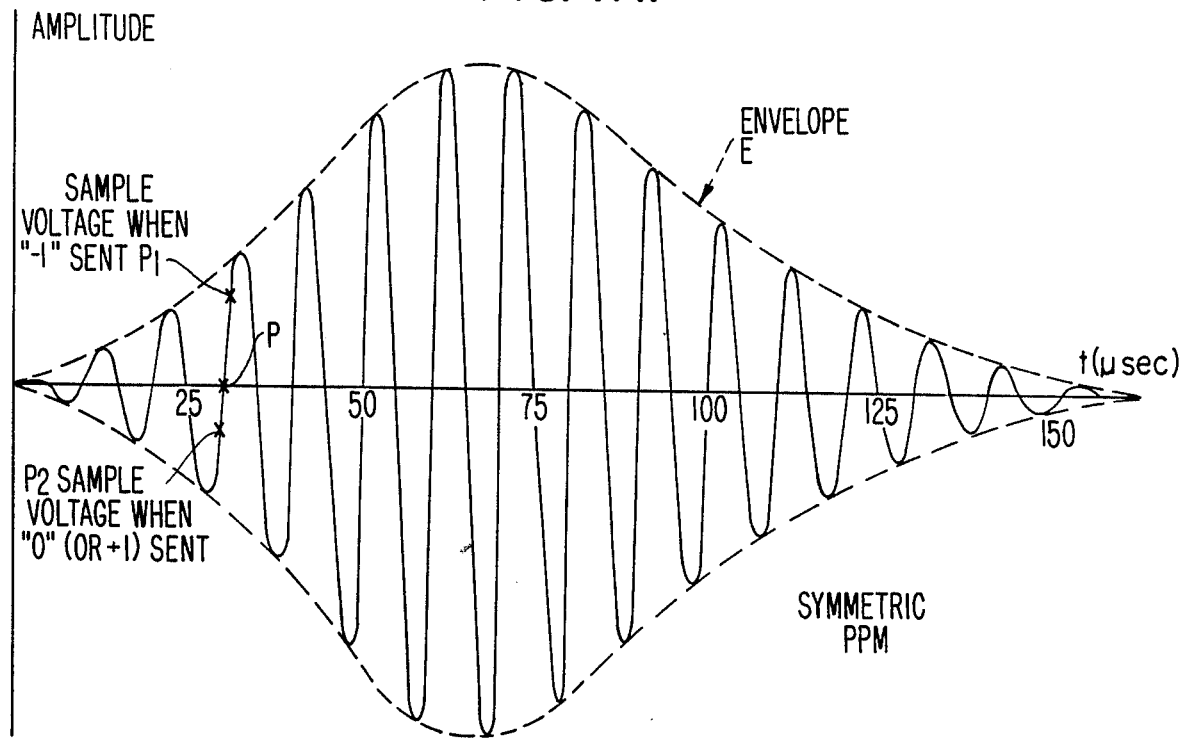

United States Patent [19]

Enge

[11] Patent Number: 4,800,391

[45] Date of Patent: Jan. 24, 1989

[54] METHOD OF AND APPARATUS FOR MESSAGE COMMUNICATION ON LORAN-C NAVIGATIONAL SIGNAL BROADCASTS AND THE LIKE WITH REDUCED NAVIGATION ERRORS

[75] Inventor: Per Enge, Groton, Mass.

[73] Assignee: Megapulse, Inc., Bedford, Mass.

[21] Appl. No.: 116,461

[22] Filed: Nov. 3, 1987

[51] Int. Cl.$^4$ ............................ G01S 1/24; H03K 7/04
[52] U.S. Cl. .................................... 342/389; 342/390; 375/23
[58] Field of Search ............... 342/387, 388, 389, 390, 342/391; 364/452; 375/23

[56] References Cited

U.S. PATENT DOCUMENTS

| | | | |
|---|---|---|---|
| 3,711,725 | 1/1973 | Johannessen | 307/108 |
| 3,736,590 | 5/1973 | Lipsey et al. | 343/103 |
| 3,774,210 | 11/1973 | Mollod et al. | 343/103 |
| 3,889,263 | 6/1975 | Johannessen | 343/103 |
| 3,921,076 | 11/1975 | Currie | 325/321 |
| 4,001,598 | 1/1977 | Johannessen | 307/106 |
| 4,151,528 | 4/1979 | Johannessen | 343/103 |
| 4,392,138 | 7/1983 | Jasper et al. | 343/103 |
| 4,423,419 | 12/1983 | Johannessen | 343/387 |
| 4,482,896 | 11/1984 | Menick | 343/390 |

OTHER PUBLICATIONS

*Radio Navigational Journal,* Wild Goose Association, Acton, MA, 1975.
Walter N. Dean, "Clarinet Pilgrim System," The Magnavox Company Government and Industrial Group, Fort Wayne, Indiana; Sep. 30, 1973.
ITT Avionics Division, "Loran-C Phase Modulation Study, Final Technical Report," vol. I, Jun. 1970.
D. A. Feldman et al, "The Coast Guard Two Pulse Loran-C Communications System," *Journal of the Institute of Navigation,* vol. 23, No. 4, Winter 1976–1977, pp. 279–285.
"Proceedings of the Institute of Navigation National Marine Navigation Meeting," Hunt Valley, Maryland, Oct. 14–15, 1975.

*Primary Examiner*—Theodore M. Blum
*Assistant Examiner*—Gregory C. Issing
*Attorney, Agent, or Firm*—Rines and Rines Shapiro and Shapiro

[57] ABSTRACT

In a Loran-C message communication system a method of obviating errors in navigation locking caused by sampling reception at the conventional symmetrical pulse modulation time intervals in advance of and in delay from the normal transmission interval, through rendering the pulse modulation assymetrical to a degree that compensates for different cycle amplitudes at sampling points above and below the desired sixth zero crossing used for navigation position determination.

10 Claims, 2 Drawing Sheets

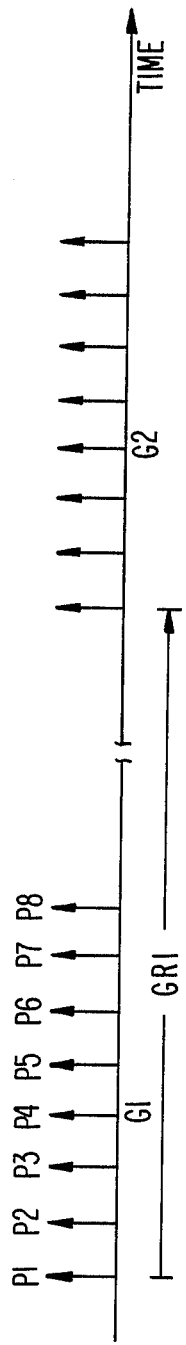
FIG. 2A.
FIG. 2B.
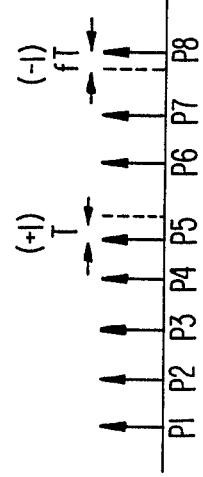
FIG. 3.
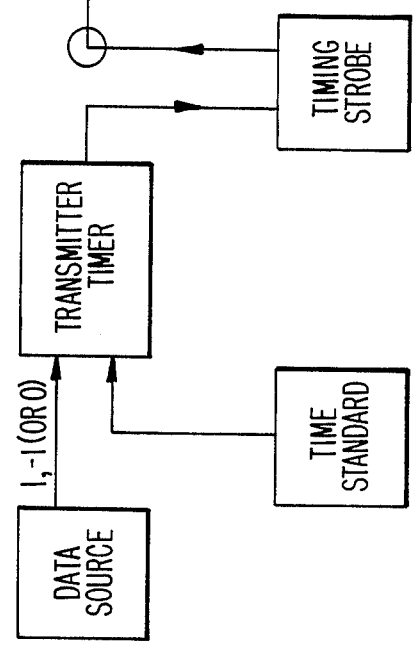
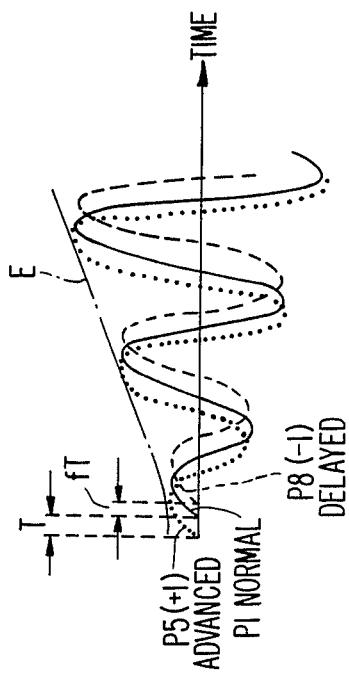
FIG. 2C.

METHOD OF AND APPARATUS FOR MESSAGE COMMUNICATION ON LORAN-C NAVIGATIONAL SIGNAL BROADCASTS AND THE LIKE WITH REDUCED NAVIGATION ERRORS

The present invention relates to the introduction into Loran-C navigational radio broadcast signals and the like of message communication, as in the form of digital data introduced as pulse phase or pulse time modulation into the successive Loran-C pulses constituting the groups that are successively transmitted, for enabling vehicles, ships and the like, to determine their position from the signals and also to receive the communication messages simultaneously broadcast; the invention being more particularly directed to techniques for reducing errors caused by the pulse position modulation introduced upon the successive pulses in the groups of pulses resulting from the Loran-C or other navigation receivers becoming confused into locking onto an erroneous "zero crossing", for navigation purposes, in the light of the modifications introduced by the pulse modulation by the communication message superimposed on the Loran-C groups of pulses.

Loran-C transmitting equipment is described, for example, in U.S. Pat. Nos. 3,711,725, 4,151,528, 3,889,263, 4,001,598 and 4,423,419, of common assignee herewith. The groups of spaced Loran-C pulse transmissions are received in vehicle location navigation receivers which monitor for a particular zero crossing in the third cycle of the buildup of each Loran pulse of the groups of Loran pulses—i.e., the sixth zero crossing point. Suitable receiver equipment for such purposes is described, for example, in U.S. Pat. Nos. 3,921,076, 3,736,590, 3,774,210, 4,392,138 and 4,482,896.

It has heretofore been proposed, simultaneously with the transmission of Loran-C and similar navigational broadcast signals, to include in the train of navigation signals, modulations on the same carrier that could contain communication messages, as in digital data information form. Among the prior proposals for such operation have been the so-called Clarinet Pilgrim system, used by the U.S. Navy and described by Dean W. N., "Loran-C for Emergency Communications", Maganvox, Fort Wayne, Ind., Sept. 30, 1973; International Telephone and Telegraph, "Loran-C Phase Modulation Study; Final Technical Report, Volume 1", prepared for the U.S. Coast Guard, June, 1979; and Radio Navigation Journal 1975, Wild Goose Association, Acton, Mass., 1975.

In Clarinet Pilgrim, the first two pulses of the group of eight Loran-C pulses constituting a first group transmission are not modulated; but one or more of pulses three through eight are modulated by moving the pulse back and forth in time intervals of one microsecond—so-called pulse position modulation. Usually, pseudo-random or plain data is used to modulate the pulse position, but on occasion, a synchronization word may be transmitted. In either event, the data is multiplied by a "bit flip" or inversion sequence or its complement, before it is applied to the pulse position modulation. Indeed, when the first, third or any odd pulse groups is modulated, then the bit flip sequence is 00+−−+−−+. When the second, fourth or any even pulse group is modulated, then the complement of the bit flip sequence 00−+−−++−− is used. As an example, assume that the data stream +−+−+−+−+−+− is to be sent by a master station, beginning with a first interval. Pulses three through eight of that interval would be modulated as follows: ++++−−, because this sequence is the product of the first part of the data stream and the bit flip sequence. The plus causes a pulse to be advanced by usually one microsecond or a fraction thereof such as ¾ microsecond, and the minus causes the pulse to be delayed by an identical time. Pulses three through eight of the following interval, or second group of Loran-C pulses would be modulated, for example, −−−−++. Among the problems with this type of message communication modulation upon the Loran-C navigation transmissions is the fact that at the time of sampling of the third cycle by the receiver monitor, the amplitude of the cycle of the Loran-C pulse is in the process of increasing in magnitude as the onset envelope or buildup of the Loran-C pulse is generated, so that, as later explained, there is a different amplitude of signal at, for example, a one microsecond advance modulation point from the amplitude at the symmetrical one microsecond delay modulation point sampled by the receiver, introducing errors that can confuse the Loran-C receiver in its navigation unction as to the actual zero crossing point of the third cycle (or sixth zero crossing point), as before mentioned, or whatever other reference may be selected. Thus, errors in navigation position detection may be introduced by this type of modulation of the transmission to include communication messages.

Thus, if pulse position modulation is used, then the user receiver unavoidably attributes the position (or phase) shift as a shift in its position. The modulation scheme, therefore, must cancel or balance this shift as quickly as possible. Indeed, the receiver is constantly integrating or smoothing the pulse position (or phase) data as described in said receiver patents. The receiver never estimates its position based on a single pulse measurement, and typically integrates data for 1 to 10 seconds. This integration time is known as the receiver time constant. If the pulse position modulation caused by the data can be balanced quickly relative to the receiver time constant, then the data modulation will have negligible effect on the navigation receiver—the proposed invention providing superior performance in this respect.

As before stated, the invention accounts for the fact that the envelope of the leading edge of the Loran pulse is not constant but rising. The Clarinet Pilgrim and other later-described schemes use symmetric pulse position modulation wherein a "1" causes the pulse to be advanced by exactly T seconds and a "−1" (or binary "0") causes the pulse to be delayed by exactly the same T seconds. The Loran pulse itself, however, is not symmetric about the sampling point, and consequently, the "1" causes the receiver to sample a negative half-cycle position voltage, and the amplitude or magnitude of this voltage is slightly less than the amplitude or magnitude of the positive half-cycle portion voltage which the receiver samples if a "−1" (or binary "0") is sent. Some of the modulation schemes later described guarantee that an equal number of "1"s and "0"s will be sent; but even so, exact balance will not be achieved in the receiver and a bias error in the measured time of signal arrival will result. This time measurement error will be approximately 30 to 200 nanoseconds, and the resulting position error will be 30 to 1,000 feet.

The method underlying the invention reduces this effect by using asymmetric pulse position modulation.

A 1 causes the pulse to be advanced by exactly T seconds and the −1 causes the pulse to be delayed by fT seconds where f is smaller than dnity, usually approximately equal to about 0.90 to 0.97, a substantial fraction of T.

Similar problems exist with other types of message communication techniques on Loran-C navigation signal transmissions, including the so-called Teletype II system described, for example, in said Radio Navigation Journal article; and in the Coast Guard Two-Pulse Loran-C Communication System also described, for example, in the Radio Navigation Journal, and in Feldman, D. A., et al., "The Coast Guard Two-Pulse Loran-C Communications System", Navigation-The Journal of the Institute of Navigation, Vol. 23, No. 4, 1976-77; also published in the proceedings of the Institute of Navigation National Marine Navigation meeting, Hunt Valley, Md., Oct. 14-15, 1975; and in the U.S. Coast Guard High-Speed Communication System similarly described in the Radio Navigation Journal and also in the said International Telephone and Telegraph Report of June 1979; and again the invention herein obviates the navigation error susceptibility of these symmetrical pulse position modulation techniques, as well.

An object of the present invention, accordingly, is to provide a new technique for obviating these kinds of navigational errors caused by the pulse position modulation of Loran-C pulses in the successive groups of transmitted Loran broadcasts; it being an object of the invention to provide a new and improved method of and apparatus (transmitters and receivers) for message communication on Loran-C navigational signal broadcasts with greatly reduced possibility of navigation errors involved in the reception process.

Other and further objects will be explained hereinafter and are more particularly delineated in the appended claims.

In summary, from one of its important aspects, the invention contemplates a method of pulse position modulation of Loran-C pulses that, unlike the symmetrical one microsecond advancing or delaying of successive Loran-C pulses of the prior art, provides for asymmetrically pulse position modulating Loran-C pulses by advancing a pulse an interval greater than the interval of delaying of another pulse affected in the modulation, the difference in the asymmetrical time interval of advancing being an amount sufficient to compensate for the different amplitude or magnitude of the negative and positive cycle portions at the third or reference cycle of the delayed and advanced sampling point cycle position amplitudes being monitored by the receiver at sampling times.

Preferred and best mode embodiments and details are hereinafter presented.

Figure 1B:
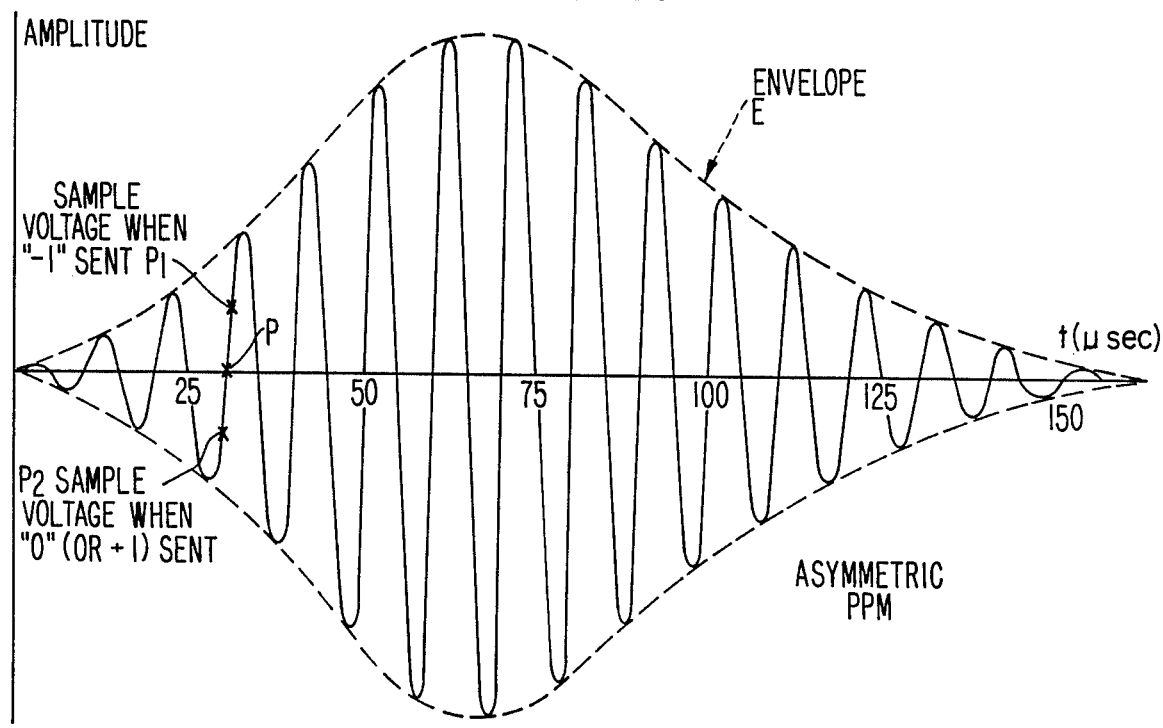

The invention will now be described with reference to the accompanying drawings, FIGS. 1A and 1B of which are graphs illustrating the points of sampling of successive pulse position modulated Loran-C pulses in accordance with the prior art and in accordance with the present invention, respectively;

FIGS. 2A and 2B are pulse timing diagrams respectively illustrating the normal pulsing timing of Loran-C transmissions and the modulated pulse timing in accordance with the technique of the present invention;

FIG. 2C is a wave form diagram of the modulated series of Loran-C pulses, the solid-line wave form representing the normal radio-frequency Loran-C pulse, the dotted wave form representing an advanced Loran-C pulse in the communication modulation (advanced by T) and the dash-line wave form, a delayed pulse (delayed by a lesser time period $f^T$); and FIG. 3 is a block diagram of a transmitter for operation with the technique of the invention that will produce the performance illustrated in FIGS. 1B and 2B and 2C.

Referring to FIG. 1A, the before-mentioned Loran-C type of rising and falling envelope E is shown formed by the buildup of the successive cycles of the radio frequency burst or pulse and then its tail off, as described in the before-mentioned transmitter patents. The sixth zero crossing point at the third cycle, indicated by the letter P at the thirty microsecond interval along the time or abscissa axis, is the capture point customarily monitored by the receiver for purposes of determining the navigation location of the vehicle containing the receiving equipment, as described in the previously cited receiver patents. The pulse of FIG. 1A is diagramatically shown at P1 in FIG. 2A in arrow form, to illustrate the successively spaced groups, G1, G2, etc. of transmitted Loran-C pulses, the first group G1 having eight pulses (P1-P8) shown successively presented with one millisecond normal (unmodulated) timing position spacing between successive pulses, and the second group G2 similarly having uniform, normal one millisecond spacing between the pulses, but spaced from the earlier group G1 by a group repetition interval (GRI) usually of the order of 50 to 100 milliseconds.

In accordance with the before-mentioned Clarinet Pilgrim system, Teletype II, Coast Guard II Pulse Loran-C Communication System, and U.S. Coast Guard High-Speed Communication prior communication modulation techniques and others suggested, the successive pulses P1, P2, P3, etc., make up the first group G1 and have, as before stated, in normal (unmodulated) pulsing timing, the same one millisecond spacing. This is modified in these prior art modulation systems, generally starting with P3 and going through P8, by introducing the communication message of digital data signals by way of pulse position modulation in the P3 through P8 Loran C pulses. As before explained, these pulses, or some of them, in accordance with the signals, are advanced or delayed to introduce the modulation effect, as more particularly shown in FIG. 2B. The first pulse P5 is shown advanced, and a subsequent pulse P8 is shown delayed to introduce the modulation effect, corresponding to the data message, these being indicated by the numbers 1 and −1, respectively. In terms of binary digits "1" and "0", "1" corresponds to 1 and "0" corresponds to −1". The one microsecond (or sometimes ¾ microsecond) usual time interval of advance or delay (much less than the 1 millisecond interval between successive Loran-C pulses and also then the period of the radio-frequency cycle of the pulses) results in a greater amplitude or magnitude when a −1 is involved and sampled by the receiver, as shown at point $P_1$ than on the lower part of the rising third half-cycle at sample point $P_2$ in FIG. 1A, in view of the rising of the pulse envelope E; this difference in amplitude or magnitude introducing the possibility of the error of the receiver in not finding the appropriate average zero-crossing point P for navigation locking purposes.

In accordance with the present invention, instead of having this symmetrical or standard plus or minus one microsecond (or other) delay and advance as in the prior art, the present invention compensates for the above-mentioned difference in amplitude of the sample point $P_1$ when a −1 (delay) is involved on the positive portion of the third cycle upswing, and the negative amplitude of less value at $P_2$ when the sample voltage for the 1 (advance) is involved. Thus the symmetrical pulse position modulation in the prior art is changed, in accordance with the invention, to an asymmetrical pulse position modulation by modifying the time of delay, making it less than the time of advancing to a degree that will compensate for this difference in amplitude, and, in reception, the demodulation will accommodate to recover the original communication data. This is shown in FIGS. 2B and 2C wherein the pulse P5 is shown advanced in time by, say, a time T—the one microsecond; whereas the pulse P8 is delayed or made later by fT seconds, where f, as before explained, is a substantial fraction, such that the delay may be of the order of, say, 900 nanoseconds or 0.9 microsecond to compensate for the greater amplitude of P-to-$P_1$ as compared with the lesser magnitude P-to-$P_2$ in FIG. 1A. Under such circumstances, it has been determined that the before-mentioned errors in navigation locking caused by the pulse position modulation in symmetric systems of the prior art is admirably overcome and the receiver, as of the before-mentioned articles, is adjusted in reception separately to demodulate the asymmetric time interval modulation about the sixth zero crossing to recover the original communication data, irrespective of the asymmetry of the modulation intervals.

Thus, in the typical transmitter system of FIG. 3, schematically representing that of the transmitters of before-mentioned prior transmitter patents or referenced articles, the communication data (1, −1 or 0) for modulation of the position of one or more of the Loran-C pulses P3-P8, FIG. 2B, is shown applied at the time-standard-controlled Loran-C pulse timer, which in turn controls a timing strobe that insures the appropriate advancing or delaying of the Loran-C pulse generated by the transmitter and broadcast by the antenna. As before intimated, the receiver will be similarly time-strobed in demodulation to recover the original modulation data.

Further modifications will occur to those skilled in this art, including the applicability of the technique of the invention to other types of transmissions, as well, and such shall be considered to fall within the spirit and scope of the invention as defined in the appended claims.

What is claimed is:

1. A method of pulse position modulating successive Loran-C pulses while obviating errors caused by such modulation in the sampling reception determination of a predetermined zero crossing of a captive cycle monitored for navigation position determination, said method comprising pulse-position modulating said pulses from the normal unmodulated pulse timing positions asymmetrically for pulse position advance and delay, and adjusting the degree of asymmetry to compensate for the difference in amplitudes of the negative and positive portions of said cycle at equal reception sampling times on each side of the said zero crossing.

2. A method as claimed in claim 1 and in which said zero-crossing is the sixth zero crossing at the third cycle of the Loran-C pulse, and the pulse position advance modulation position from the normal unmodulated position is set at T, and the delay modulation position is set at fT, where f is a substantial fraction of T.

3. A method as claimed in claim 2 and in which fT is of the order of about 0.9 T to 0.97 T.

4. A method as claimed in claim 3 and in which T is of the order of about a microsecond.

5. A method as claimed in claim 2 and in which the modulation is effected on the third to eighth Loran-C pulses of successive groups of such pulses with the first two pulses unmodulated.

6. A Loran-C transmitting apparatus for broadcasting successive Loran-C pulses simultaneously with pulse position modulated data communication having, in combination, means for advancing and delaying from the normal unmodulated pulse timing positions of the successive Loran-C pulses of successive groups certain of the pulses of each group in accordance with the data to be communicated; and means for asymmetrically advancing and delaying the pulses with a degree of asymmetry adjusted to compensate for the difference in amplitudes of the negative and positive portions of the third cycle immediately before and after the sixth zero crossing of the Loran-C pulse.

7. A Loran-C transmitting apparatus as claimed in claim 6 and in which the time of the delaying pulse position is adjusted to the order of about 0.9 to 0.97 of the time of the pulse position advancing in the modulation.

8. A Loran-C transmitting apparatus as claimed in claim 6 and in which means is provided for effecting the modulation on the third to the eight Loran-C pulses of each group with the first two pulses unmodulated.

9. In a Loran-C communication method in which the broadcast transmissions are effected as claimed in claim 1, during said reception, the said zero crossing is monitored for said navigation position determination, and the asymmetrical pulse position modulation advance and delay of the said successive Loran-C pulses is separately monitored and demodulated at said equal reception sampling times on each side of the said zero crossing to recover the original modulations irrespective of the asymmetry of the modulation intervals.

10. In a Loran-C navigation and communication system using a transmitter as claimed in claim 6, means for receiving said successive Loran-C pulses simultaneously with the asymmetric pulse position modulated communication data, and means operable while monitoring for said sixth zero crossing for navigation position determination, for separately monitoring and demodulating the asymmetrically advanced and delaydd pulses of said negative and positive portions at said third cycle of successive Loran-C pulses to recover said communication data irrespective of the asymmetry of the modulation intervals.

* * * * *